UNITED STATES PATENT OFFICE.

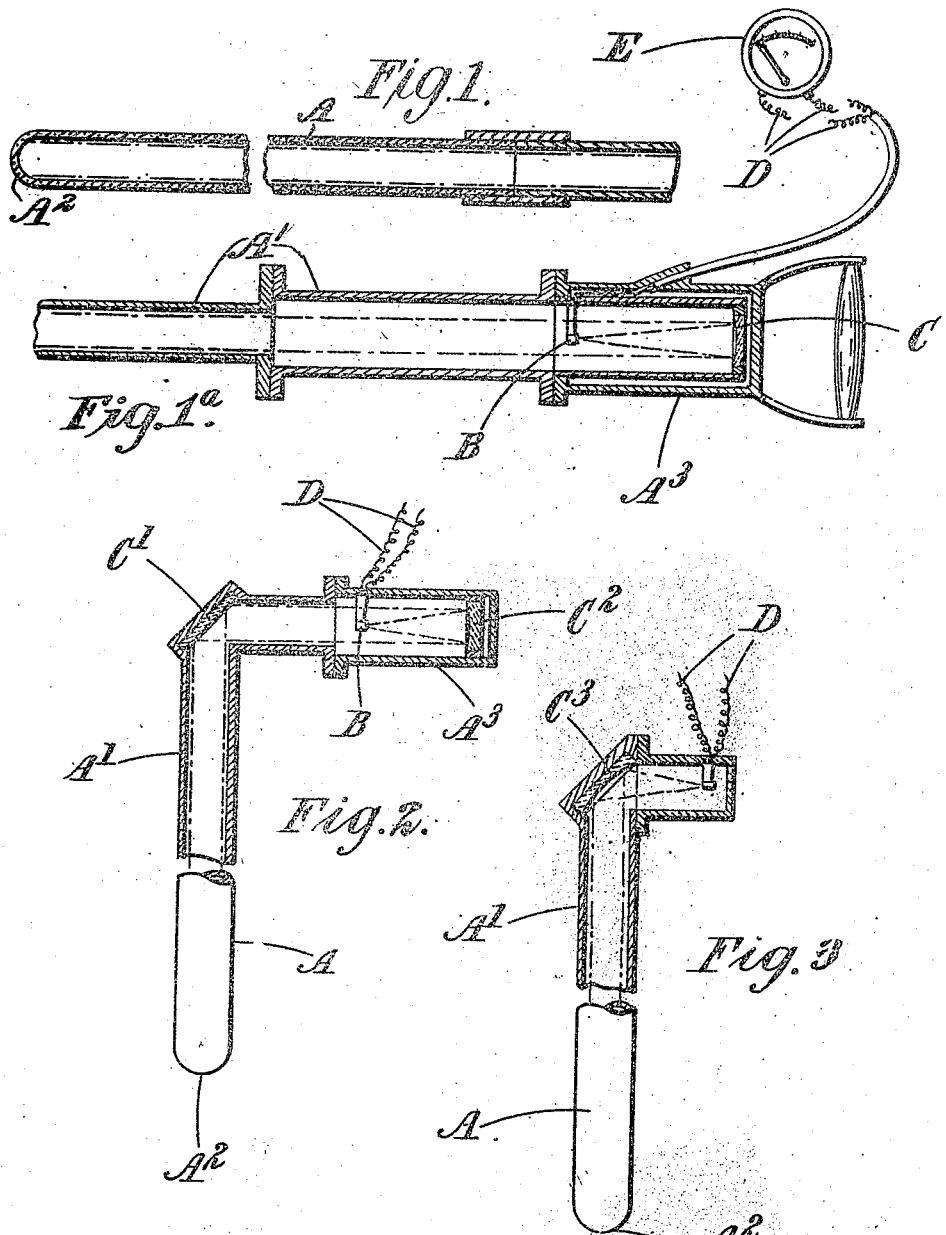

ROBERT STEWART WHIPPLE, OF CAMBRIDGE, ENGLAND, ASSIGNOR TO THE TAYLOR INSTRUMENT COMPANIES, OF ROCHESTER, NEW YORK.

RADIATION-PYROMETER.

1,125,233.

Specification of Letters Patent.   Patented Jan. 19, 1915.

Application filed August 18, 1910.   Serial No. 577,795.

*To all whom it may concern:*

Be it known that I, ROBERT STEWART WHIPPLE, a subject of the King of England, residing at Cambridge, county of Cambridge, England, have invented certain new and useful Improvements in Radiation-Pyrometers, of which the following is a specification.

This invention relates to radiation pyrometers, that is, to pyrometers in which the sensitive element is not subjected to the actual temperature of the body whose temperature is required but to a portion of the radiant heat therefrom, so that the sensitive element is only raised in temperature by a fraction of the true temperature of the body.

The great advantage of radiation pyrometers is that owing to the fact just mentioned the sensitive element does not wear out rapidly even though it is used to measure extremely high temperatures. The chief disadvantage in radiation pyrometers hitherto used is that their readings depend not only upon the temperature of the body itself but upon the nature of the surface of the body and on the temperature of surrounding objects. For instance, if one of these pyrometers be used to determine the temperature of the molten metal in a crucible, the reading obtained by a sighting on the surface of the metal will be considerably lower when the crucible is in the open air than it will be when the crucible is inside a closed furnace, the walls of which are at approximately the same temperature as the metal. This is due to the fact that in the latter case the crucible of metal is surrounded by a black body, while in the former case this is not so; and molten metal not being itself a black body the readings obtained are therefore low. It is therefore in many cases necessary to apply corrections to the readings obtained by radiation pyrometers in order to obtain true temperatures. Also most types of radiation pyrometers have the further disadvantage that they require focusing on the body whose temperature is being obtained before a reading is taken.

The objects of this invention are, while retaining the advantage already mentioned of keeping the sensitive element outside the zone of intense heat, to secure the further advantage of avoiding the necessity of applying any corrections to the readings to obtain true temperatures, and also to avoid the necessity of focusing the instrument before a reading is taken.

In a radiation pyrometer according to this invention a closed conduit which is also closed at one end is so arranged that heat radiated along the conduit from its closed end is always focused on to the sensitive element without preliminary adjustment.

More particularly this pyrometer comprises the combination of a tube closed at one end but open at the other end, a heat sensitive element situated in the open end of the tube and a device for concentrating heat radiated from the inside of the closed end of the tube on to the sensitive surface.

According to one modification of the invention when using the pyrometer the closed end of the tube is subjected to the heat of the furnace or source of heat for a length of several diameters of the inside of the tube from the closed end. Thus the inside of the closed end of the tube is a black body and the readings are independent of the nature of the surface of the closed end of the tube.

This invention will now be described with reference to the accompanying drawings which illustrate partly diagrammatically several constructions by which it may be carried into effect.

Figure 1 is a longitudinal sectional view of one end of a pyrometer, constructed in accordance with a preferred embodiment of the invention; Fig. 1ª is a similar view of the opposite end; Fig. 2 is a similar view of another modified form, and Fig. 3 is a similar view of a further modification.

As illustrated in Figs. 1 and 1ª a tube A A¹ is employed of definite length and closed at the end A², having mounted at the other end a pyrometer head A³ of special design containing the sensitive element B. A concave mirror C of short focal length is mounted in this pyrometer head in such a manner that an image of the inside of the closed end of the tube is formed a few inches in front of the mirror. The sensitive element B is so situated that this image coincides with it. To use the pyrometer the closed end A² of the tube is inserted in the furnace, crucible of molten metal, or other body whose temperature is required, the other end of the tube carrying the pyrometer head A³ remaining at a comparatively low temperature. The sensitive element therefore has its temperature raised above the temperature of the surrounding pyrometer head by an amount dependent upon the intensity of the heat image formed by the mirror and therefore by an amount dependent upon the temperature of the closed end of the pyrometer tube. Since for the same pyrometer the concave mirror is always at the same distance from the closed end of the tube the instrument can be adjusted so that the image coincides with the sensitive element once for all, and will therefore not need focusing or otherwise adjusting each time it is used. Also, since the pyrometer tube will in practice be made of a fairly small diameter and will be subjected to the heat of the furnace for a length of several diameters measured from the closed end, the conditions necessary for true black body radiation from the inside of the closed end of the tube are secured and the readings will therefore be independent of the nature of the surface of the closed end of the tube.

A variety of different devices may be made use of for the sensitive element, one of the simplest being to use a small thermocouple as diagrammatically illustrated in Fig. 1, this being connected by leads D from the pyrometer head to an indicating or recording millivoltmeter E or suitable current measuring device whose scale is calibrated in terms of the temperature of the closed end of the tube. Other devices might be used depending for their principle of operation on the change of resistance of a wire with temperature, or the expansion of metals with temperature etc.

It will be seen that the only part of the pyrometer which is subjected to the full temperature being measured is that portion of the tube A near and at the closed end $A^2$. Provision is therefore made for renewing this portion quickly and cheaply by making the tube in two parts. The renewable end portion A need not necessarily be of the same material or size as the other permanent portion and while the latter will usually be of steel, the renewable portion may be of steel, porcelain, silica, plumbago etc., according to the temperature and purpose for which the instrument is used.

It is obvious that modifications may be made in carrying this invention into effect for example although a concave mirror has been mentioned as the means of producing the heat image which coincides with the sensitive element, other methods of producing this image might be used.

In certain cases, as for instance when used for measuring the temperature of crucibles of molten metal it may be an advantage to have the pyrometer of an L shape as illustrated in Figs. 2 and 3. This may easily be obtained by fixing a mirror in the angle so that the heat rays received on it from the closed end of the tube are deflected along the axis of the tube to the pyrometer head.

In the construction illustrated in Fig. 2 a plane surfaced mirror $C^1$ is disposed in the angle and the heat rays are thereby deflected on to a concave mirror $C^2$ by which latter they are concentrated on to the sensitive element B.

In Fig. 3 a construction is illustrated in which a concave mirror is employed in the angle whereby not only is the path of the heat rays deflected substantially 90° but the rays themselves are concentrated on to the sensitive element B.

It is obvious that modifications other than those described may be made in details of construction provided always that the spirit of the invention is not departed from.

What I claim as my invention and desire to secure by Letters Patent is:—

1. A radiation pyrometer comprising a portable tube having one end closed, said end being formed of opaque material and adapted to be subjected to the source of heat, a sensitive element disposed in proximity to the opposite end of the tube, and means for concentrating the heat upon said sensitive element.

2. A radiation pyrometer comprising a hollow portable device having one end forming a black body adapted to be subjected to the source of heat, a sensitive element disposed in proximity to the opposite end of the tube, and means for concentrating the heat upon the sensitive element.

In testimony whereof I have signed my name to this specification in the presence of two subscribing witnesses.

ROBERT STEWART WHIPPLE.

Witnesses:
 HARRY G. GIDGE,
 P. H. RUNDELL.